United States Patent [19]
Simon et al.

[11] Patent Number: 5,415,124
[45] Date of Patent: May 16, 1995

[54] DIAL ARRANGEMENT FOR A COMBINATION INSTRUMENT

[75] Inventors: Ernst-Ulrich Simon, Oberursel; Stephan Zech, Eltville, both of Germany

[73] Assignee: VDO Adolf Schindling AG, Frankfurt, Germany

[21] Appl. No.: 112,854

[22] Filed: Aug. 27, 1993

[30] Foreign Application Priority Data

Dec. 2, 1992 [DE] Germany .......................... 42 40 456.8

[51] Int. Cl.6 ........................................... G01D 13/04
[52] U.S. Cl. ................................................... 116/334
[58] Field of Search ...................... 116/62.4, 334, 335; 29/DIG. 37

[56] References Cited
FOREIGN PATENT DOCUMENTS 3319407  11/1984  Germany ............................ 116/334

Primary Examiner—William A. Cuchlinski, Jr.
Assistant Examiner—Willie Morris Worth
Attorney, Agent, or Firm—Martin A. Farber

[57] ABSTRACT

A dial arrangement is formed of plastically deformable material, in particular sheet metal, for a combination instrument. It has at least two individual dials which are connected to each other, each being provided with an imprint. In order to permit a curving, i.e. an arching of the array of dials provided with the imprint while the individual dials are connected to each other without impairing the appearance of the individual dials, the connection in each case of adjacent individual dials is effected by at least one web, the web being arranged outside the center connecting line of the individual dials. The web in question can thus plastically deform upon the curving of the dial arrangement so that the dial center points and the respective imprints, and thus the appearance of the dial arrangement, are retained.

14 Claims, 1 Drawing Sheet

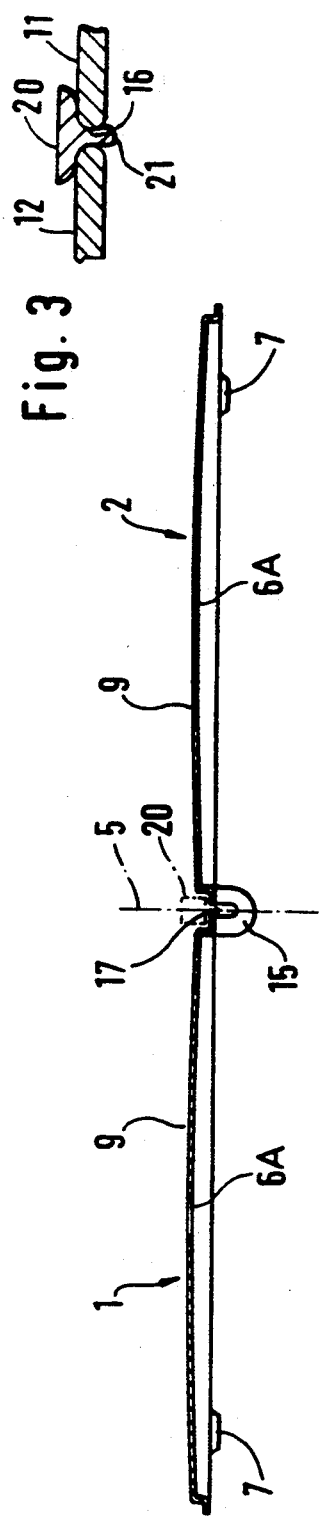
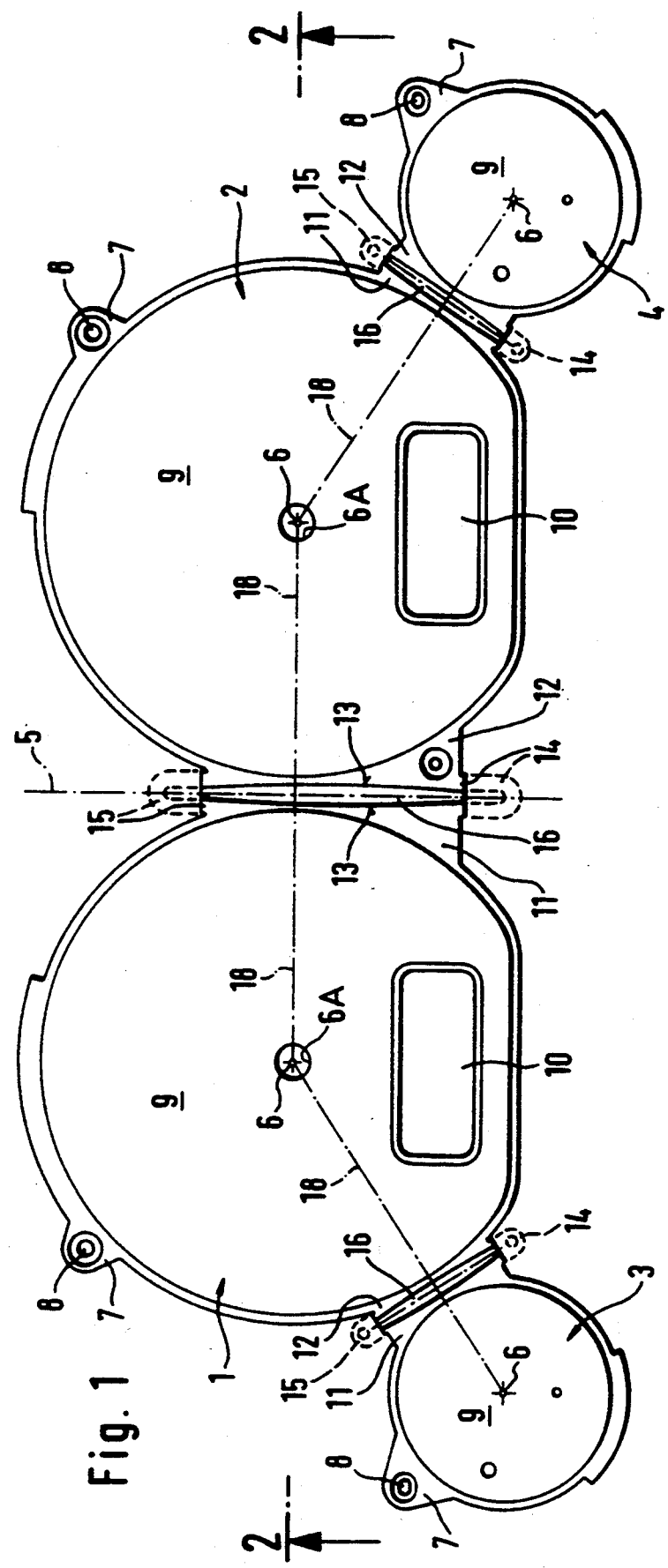

DIAL ARRANGEMENT FOR A COMBINATION INSTRUMENT

FIELD AND BACKGROUND OF THE INVENTION

The present invention relates to a dial arrangement for a combination instrument wherein the dial arrangement comprises deformable material, particularly sheet metal, and has at least two individual dials which are attached to each other, each of the dials being provided with an imprint.

As a rule, combination instruments have individual dials or flat continuous dials. If a curving of the array of dials is necessary, i.e. a slight arching of the array of dials which consist of deformable material, particularly sheet metal, exclusively individual dials are used in order to make certain that the imprint which was applied previously to the individual dial in the form Of a scale, symbol, etc. is not distorted by the curving.

SUMMARY OF THE INVENTION

It is an object of the present invention so to develop a dial arrangement of the aforementioned type that a curving of continuous array of individual dials is possible without the appearance of the individual dials being impaired.

According to the invention, the attachment between adjacent individual dials (for instance 3,1; 1,2; 2,4) is effected by at least one web (for instance 14; 15), the web being arranged outside a center connecting line (for instance, 18) of the individual dials.

With the solution provided by the invention, the individual dials may be of different shape. A circular shape is preferred, in which connection a part of the circle can be replaced by a straight line segment, if desired. Regardless of this, in principle, all shapes of individual dials are conceivable which permit a curving of the individual dials, and thus also square or polygonal shapes. By the expression "center connecting line of the adjacent individual dials" there is understood the line which connects the centers of the individual dials or the individual regions of the individual dials of the curved array to each other.

An eccentric arrangement of at least one web referred to the center connecting line permits a flow of material, particularly of the material of the web, so that the center points of the individual dials and the imprints on them and thus their appearance is retained.

In accordance with a special embodiment of the invention, the adjacent individual dials are connected together by two webs (14, 15) which are arranged on both sides of the center connecting line (18) of the individual dials. Upon the curving, the plastic deformation therefore takes place in the region of the two webs which, due to their position on both sides of the center connecting line, assure the maintaining of a desired position of the individual dials with respect to each other.

One advantageous further development provides that adjacent individual dials are provided on the side facing each other with extensions (11, 12), a slot (16), limited at both ends by the webs, being formed between the extensions (11, 12). Upon the curving of the individual dials, which as a rule is effected simultaneously, the plastically deformable webs serve as connection of the individual dials, and the slot between the individual dials widens in accordance with the degree of curving.

A preferred development provides that the web in question (14; 15) has the shape of an arc which is directed away from the center connecting line (18), the web (14; 15) extending in the plane of the individual dials when the individual dials (3,1; 1,2; 2,4) are not curved and being bent at an angle out of said plane upon the curving of the individual dials. When the array of the individual dials has been curved, an individual web should be positioned essentially in a plane perpendicular to the starting position which it had when the array of the individual dials is planar, prior to the curving. This development takes into consideration the fact that the permanent connection between the individual dials may lie in a region which is required for other components. This space problem is solved in the manner that the webs arranged between the individual dials are bent, they being advantageously directed away from the printed side of the individual dials. This development of the connection between the individual dials makes it possible to cover the regions of connection with a mask or similar part, the bending resulting from the arcuate shape of the web assuring the strength necessary to receive a masking rib.

According to a feature of the invention, when the array of the individual dials (3,1; 1,2; 2,4) has been curved, each corresponding web (14; 15) is directed away from the printed side (9) of the respective individual dials.

Further according to the invention, when the array of the individual dials has been curved, the space (16, 17) formed between them serves to receive a covering, a rib on the covering being adapted to be inserted into said space (16, 17).

The invention also provides another feature wherein the corresponding individual dial (1; 2; 3; 4) is substantially circular.

Still according to another feature of the invention, adjacent individual dials (3,1; 2,4) are of different size.

Also by the invention, the dial arrangement has four individual dials (3, 1, 2, 4) arranged in a row, adjacent individual dials (3,1; 1,2; 2,4) being in each case connected by two webs (14, 15) with slot (16) formed between them.

BRIEF DESCRIPTION OF THE DRAWING

With the above and other objects and advantages in view, the present invention will become more clearly understood in connection with the detailed description of a preferred embodiment, when considered with the accompanying drawing, of which:

FIG. 1 is a stylized top view of the dial arrangement, seen in the direction of the imprint (not shown), after the curving;

FIG. 2 is a section along the line 2—2 of FIG. 1; and

FIG. 3 is a sectional view of a covering disposed in a slot between extensions of adjacent dials.

DETAILED DESCRIPTION OF THE PREFERRED EMBODIMENT

The dial arrangement shown in FIG. 1 consists of four individual dials 1, 2, 3, 4, which are arranged symmetric to an axis 5 and are, in each case, connected to each other. The individual dials 1 to 4 and their connections consist of sheet metal; the individual dials are provided with an imprint (not shown).

The two central individual dials 1 and 2 are essentially circular in shape, i.e. in their case an arcuate region extending over an angle of about 60° is replaced by a straight line, while the outer individual dials 3 and 4 are fully circular. The centers of the individual dials 1 to 4 are designated by the reference numerals 6. For the mounting of the dial arrangement in a system support of the combination instrument, the individual dials 1 to 4 are provided in their peripheral regions with extensions 7 which contain holes 8 in order to fasten the dial arrangement by fastening elements (not shown) within a system support. The reference numeral 9 indicates the imprint area of the corresponding dial 1 to 4. Specific dial markings within each imprint area 9, as well as pointers for pivoting around centers 6 of the dials 1–4, are well known in the construction of instruments and, accordingly, have been deleted to simplify the drawing. Openings 6A for pointer spindles are shown in FIGS. 1 and 2. The middle individual dials 1 and 2 are provided in the straight region of their periphery with substantially rectangular cut-outs 10, within which other electric components (not shown) held in the system support are active.

The two large individual dials 1 and 2 have on the sides facing each other extensions 11 and 12 the edges 13 of which which face each other and are arranged parallel to each other and at a slight distance apart before the dial arrangement has been curved. In the region of the free ends of the two extensions 11 and 12, referred to the axis 5, two arcuate webs 14 and 15 connect them together. In the initial position of the dial arrangement, i.e. with the dials not curved so that their imprint surfaces 9 are flat, the webs 14 and 15 lie in the plane of the imprint surfaces 9, as indicated by dot-dash line in FIG. 2. Upon the curving of the array of individual dials 1 and 2, in which connection the array of imprint surfaces 9 of these individual dials 1 and 2 curve upward out of the plane of the drawing —see also FIG. 2 —the webs 14 and 15 are plastically deformed. The webs 14, 15 move away from the initial position of the imprint surfaces 9 by an angle of about 90° (see FIG. 1 —solid lines of the webs 14 and 15, FIG. 2). Furthermore the edges 13 of the extensions 11 and 12 between the individual dials 1 and 2 are moved apart from each other, most of all in the central region between the webs 14 and 15, so that a slot 16 is produced between the extensions 11 and 12.

FIG. 2 shows the bent position of the web 15 after the curving the array of the individual dials 1 and 2. The opening formed by the slot 16 and the cut-out 17 in the web 15 as well as in the web 14 serves in this connection for the attachment of a covering 20 (FIG. 3) which has a rib 21 which can be inserted into the slot 16 and the cut-out 17 (shown in phantom in FIG. 2) and is held by means of the webs 14 and 15 in the region of the two individual dials 1 and 2. The covering may be fabricated of metal as indicated in FIG. 3 or of a more pliable material such as plastic.

The dial arrangement between the large individual dial 1 or 2 and the adjoining small individual dial 3 or 4 respectively is developed in a manner corresponding to the development of the dial arrangement between the two large individual dials 1 and 2. Identical or identically acting parts have been provided with the same reference numerals for the sake of simplicity. The curving of the dial arrangement, i.e. of all four individual dials 1 to 4, takes place simultaneously, the formation of the slot and the bending of the webs taking place in the region of the connections between the individual dials.

In the above embodiment, the invention has been described for the case in which two webs 14 and 15 in each case connect adjacent dials to each other. These webs are arranged on both sides of the center connecting line 18 of the individual dials connected with each other. In accordance with the invention, it is, to be sure, sufficient if the connection is effected only by means of one web 14 or 15, arranged spaced from the center connecting line 18.

We claim:

1. A one-piece dial assembly for a combination instrument wherein the dial assembly is made of plastically deformable material to permit a curving of the assembly, and has at least two individual dials which are attached to each other, each of said dials being provided with an area having an imprint, means for receiving a pointer mechanism of the combination instrument, and means for mounting the dial assembly in a system support of said combination instrument;

wherein the dial assembly further comprises an attachment between adjacent ones of said individual dials, said attachment having at least one web located at a position offset away from a center connecting line of the adjacent individual dials.

2. A dial assembly according to claim 1, wherein said attachment further comprises a second web enabling the adjacent individual dials to be connected together by said one web and said second web, said second web being located away from said center connecting line at a side thereof opposite the position of said one web.

3. A dial assembly according to claim 2, wherein adjacent ones of said individual dials are provided on sides facing each other with extensions to said webs, said extensions defining a slot limited at both its ends by said webs and being located between the extensions.

4. A dial assembly according to claim 2, wherein each of said webs has the shape of an arc which is directed away from the center connecting line, each of said webs extending in a common plane of said individual dials in an uncurved state of the dial assembly.

5. A dial assembly according to claim 4, wherein each of said webs extends essentially in a plane perpendicular to said common plane when said assembly is curved.

6. A dial assembly according to claim 4, wherein in a curved state of the dial assembly, each of said webs is directed away from a printed side of each of said dials.

7. A dial assembly according to claim 3, wherein each of said webs has the shape of an arc which is directed away from the center connecting line, each of said webs extending in a common plane of said individual dials in an uncurved state of the dial assembly.

8. A dial assembly according to claim 7, wherein each of said webs extends essentially in a plane perpendicular to said common plane when said assembly is curved.

9. A dial assembly according to claim 8, wherein in a curved state of the dial assembly, each of said webs is directed away from a printed side of each of said dials.

10. A dial assembly according to claim 9, further comprising a covering for said slot; and wherein, in a curved state of the dial assembly, said slot is configured to receive said covering, there being a rib on the covering to be inserted into said slot.

11. A dial assembly according to claim 1, wherein said deformable material is sheet metal.

12. A dial assembly according to claim 1, wherein an individual one of said dials is substantially circular.

13. A dial assembly according to claim 1, wherein adjacent ones of said individual dials are of different size.

14. A dial assembly according to claim 1, wherein the dial assembly has four individual dials arranged in a row, adjacent individual dials being in each case connected by two of said webs with a slot formed between a pair of webs interconnecting adjacent dials.

* * * * *